United States Patent [19]
Nagel et al.

[11] Patent Number: 5,757,900
[45] Date of Patent: May 26, 1998

[54] SYSTEM AND METHOD FOR SINGLE ACCESS DATABASE RETRIEVALS

[75] Inventors: Doris Renee Nagel, Somerville; Tzyh-Jong Wang, Edison, both of N.J.; Diane Yorke, New York, N.Y.; William Michael Zimlinghaus, Jr., Somerville, N.J.

[73] Assignee: Bell Communications Research, Inc., Morristown, N.J.

[21] Appl. No.: 459,896

[22] Filed: Jun. 2, 1995

[51] Int. Cl.⁶ ............................. H04M 3/42; H04M 7/00
[52] U.S. Cl. .................. 379/207; 364/962; 364/963; 379/219; 379/230; 707/2; 711/100; 711/216
[58] Field of Search .................. 379/201, 207, 379/219, 220, 221, 230; 395/600; 364/962, 963; 707/1, 2; 711/100, 216

[56] References Cited

U.S. PATENT DOCUMENTS

| | | | |
|---|---|---|---|
| 5,287,499 | 2/1994 | Nemes | 707/2 |
| 5,506,897 | 4/1996 | Moore et al. | 379/220 |
| 5,553,127 | 9/1996 | Norell | 379/207 |

*Primary Examiner*—Harry S. Hong
*Attorney, Agent, or Firm*—Joseph Giordano; David Hey; Loria B. Yeadon

[57] ABSTRACT

In a telecommunications network, a method is provided for reading a desired telephone data record associated with a given telephone number from a line record database. Initially, a data processor reads data from an accessing data record stored in an index database. The accessing data record contains at least an accessing number designating a series of telephone numbers including the given telephone number, a pointer pointing to a data cluster in the line record database, and a blocking factor associated with the data cluster. The data cluster comprises a plurality of data nodes and includes all of the telephone data records associated with the series of telephone numbers designated by the accessing number. Each data node contains a number of individual telephone data records up to the blocking factor and a number of pointers each pointing to one of the number of individual telephone data records. The data processor accesses a data cluster based on the data read from the index database. The data processor then determines the position of a desired data node containing the desired telephone data record in the data cluster, the total number of telephone numbers in the data cluster, and the blocking factor. Then the data processor reads the desired data node and extracts the desired telephone data record from the desired data node using the pointer associated with the desired telephone data record.

10 Claims, 7 Drawing Sheets

SYSTEM AND METHOD FOR SINGLE ACCESS DATABASE RETRIEVALS

CROSS REFERENCE TO RELATED APPLICATIONS

This application is related to S. K. Man et al U.S. patent application Ser. No. 07/972,817, now U.S. Pat. No. 5,450,480, Sep. 12, 1995, the contents of which are hereby incorporated by reference.

BACKGROUND OF THE INVENTION

The present invention relates generally to an Intelligent Network ("IN"), and more specifically to a line information database ("LIDB") within the IN and a system of accessing the database in a single accessing step. Although the present invention generally relates to an IN, it can also be used with an Advanced Intelligent Network ("AIN") as well.

FIG. 1 illustrates an exemplary IN 100 comprising a Service Management System ("SMS") 110, Service Control Points ("SCPs") 120 and 130, Signal Transfer Points ("STPs") 140 and 150, and service switching points ("SSPs") 160 and 170. An SSP 160 or 170 is a piece of telephone equipment which receives and routes telephone calls received from one of a plurality of telephones 180. Each SSP recognizes a variety of "triggers" within customer telephone call signals and generates queries to SCPs based on the triggers. The SSPs then process customer calls based on information received from the SCPs.

The SCPs are configured as a mutually mated pair in different locations. If an SCP, such as SCP 120, is disabled, its mate, SCP 130, can ensure that telephone service continues without interruption.

Associated with the SCP pair 120 and 130 is an SMS 110. The SMS 110 provides a support interface through which customer data and service logic can be added or managed.

Each SCP 120 or 130 contains a LIDB 190 or 195, which processes queries from the SSPs 170. Each LIDB 190 and 195 is identical so that if one of the SCPs, such as SCP 120 containing LIDB 190, is disabled, its mate, SCP 130 containing LIDB 195, can ensure that telephone service continues without interruption. The LIDB 190 and 195 includes information relating to all working telephone numbers in a given region serviced by a single telephone service provider, e.g., Bell Atlantic, Pacific Bell, etc.

Although initially the LIDB 190 and 195 was deployed to support Alternate Billing Services ("ABSs"), such as calling card billing services, the functionality of the LIDB 190 and 195 has been expanded for use with other services. For example, the LIDB 190 and 195 has been expanded to include data necessary for the Calling Name Delivery ("CNAM") service, a service that provides a called party with the name of the person whose telephone is being used to make a telephone call to the called party. The LIDB 190 and 195 also is being considered for other telecommunications services that require additional information for call processing.

As shown in FIGS. 2A and 2B, the LIDB 190 and 195 currently consists of a two level database, a high level, or group, database 210 and a low level, or line, database 215. The group database 210 is stored in a fast memory, such as a random access memory, that can be rapidly accessed during call processing. The line database 215 is spread across several slower disk memories 220.

The group database 210, shown in FIG. 2A, includes group records 240 containing information common to all telephone numbers in a particular area code and exchange. Line records 260 contain information required for processing telephone calls when certain telecommunications services are in place. The data from the line records 260 in the line database 215, shown in FIG. 2B, is obtained by first accessing the group database 210 and then accessing the proper record in the line database 215 based on a hash function executed on the line number. An example of a hash function which may be used in this invention is shown in R. M. Nemes U.S. Pat. No. 5,287,499, issued on Feb. 15, 1994, the contents of which are hereby incorporated by reference.

Currently, telecommunications system constraints require that 99% of all telephone calls be processed within approximately one second. Since accessing data necessary to process calls comprises only part of call processing, the total time for accessing both the group and line databases 210 and 215 to obtain this data must be kept to some fraction of the one second allowed for call processing. The primary time constraint for this data access is with the time required for accessing the line database 215. Given the memory technology currently available for the line database 215, only a single access of the line database 215 may be made within the time allowed for a data read to obtain the data necessary for call processing.

During data read operations, the address of a hash bucket 230 containing the line record 260 in the line database 215 corresponding to the processed telephone number is obtained by executing a hashing function on the telephone number being processed in the group database 210. The hashing function provides a hash value corresponding to the address of the hash bucket 230 in the disk 220 that contains the desired data record. Since many telephone numbers hash to the same hash bucket 230, each hash bucket 230 must contain a number of line records 260 at least equal to the number of telephone numbers that may hash to that particular hash bucket. The entire hash bucket 230 must then be retrieved to locate a single line record 260 with the hash value corresponding to the hash bucket 230. In the current LIDB, the size of the hash bucket 230 is large enough to accommodate the line records 260 for a number of telephone numbers having the most common hash value. Since all hash buckets 230 are the same size and each must be able to accommodate line records 260 for a worst-case number of hashed telephone numbers, hash buckets 230 can become exceedingly large in size. In practice, hash buckets 230 are often larger than 100 records. Thus, a single data access to the line database 215 may result in over 100 line records 260 being read.

To correctly process a telephone number during query processing, the LIDB 190 or 195 accesses in the group database 210 the group record 240 corresponding to the area code and exchange of the telephone number being processed. If the SCP 120 or 130 finds no record or finds that the requested operation is invalid based on data found in the group database 210, access to the line database 215 may not be required. If the SCP 120 or 130 must access the line database 215, it uses the hash function to find the location of the hash bucket 230 containing the required line record 260.

The current LIDB allows for retrieval of a line record 260 for query processing using a single disk access, since the group database 210 is memory resident and only the line database 215 requires disk access. Given the large size required for the hash buckets 230 in the line database 215, however, the amount of data which is read from the disk 220 during an I/O operation approaches the limit of the amount which can be transferred while still allowing the query to be completed within the allotted processing time, i.e., 99% in less than one second. As more data is required to be placed in the line records 260 for each telephone number, this limit may soon be surpassed.

Many of today's new services require LIDB-based data other than that stored in the group records 240 and the line records 260 in the current version of the LIDB. In addition, expansion of the ABS service, both by FCC mandate and strategically by some service providers, requires that more data be stored in the LIDB. These new requirements necessitate changes to the existing LIDB to accommodate new information and permit access to that information within the current system constraints.

To meet these and future requirements, the LIDB must maintain its performance for current services, maintain capacity for current services, facilitate support for data required for new services, optimize use of disks and solid state memory, allow for access of stored data using a search key other than the area code and prefix of a telephone number, and must facilitate the addition of new database fields.

DESCRIPTION OF THE INVENTION

Accordingly, the present invention is directed to a system for single access database retrievals that substantially obviates one or more of the problems due to limitations and disadvantages of the related art.

The present invention overcomes the limitations and disadvantages noted above through the use of a variable-length line record that holds only the amount of data required for a given telephone number. Thus if the owner of a given telephone number does not subscribe to a particular service, the line record corresponding to that telephone number need not allocate disk or solid state memory space for information relating to that non-subscribed service.

The invention organizes line records into a plurality of data clusters, each containing a plurality of fixed-size data nodes, to allow individual line records to be rapidly located and read. The number of line records in each data node is fixed for a given data cluster, but may vary between different data clusters. Each data node contains one or more line records and a corresponding number of pointers for locating the line records within the data node.

To locate a desired line record, the proper data cluster and data node must first be found. Then, the entire data node is read from disk and the proper line record is obtained from the read data node though the use of pointers stored in the data node.

By using fixed-size data nodes having a varying number of variable-sized line records, the invention allows for large line records without requiring empty space in each line record for every possible piece of data.

Additional features and advantages of the invention will be set forth in the description which follows, and in part will be apparent from the description, or may be learned by practice of the invention. The objectives and other advantages of the invention will be realized and attained by means of the instrumentalities and combinations particularly pointed out in the written description and appended claims hereof as well as the appended drawings.

To overcome the disadvantages of the prior art and in accordance with the purposes of the invention, as embodied and broadly described, our invention comprises, in a telecommunications network, a method for reading a desired telephone data record associated with a given telephone number from a line record database, the method comprising the steps, executed by a data processor, of reading from an index database stored in memory, an accessing data record containing at least an accessing number designating a series of telephone numbers including the given telephone number, a pointer pointing to a data cluster in the line record database, and a blocking factor associated with the data cluster, the data cluster comprising a plurality of data nodes and including the telephone data records associated with the series of telephone numbers designated by the accessing number, each data node containing a number of individual telephone data records up to the blocking factor and a number of pointers, each pointer pointing to one of the number of individual telephone data records; accessing the data cluster; determining the position of a desired data node containing the desired telephone data record in the data cluster, the total number of telephone numbers in the data cluster, and the blocking factor; reading the desired data node; and extracting the desired telephone data record from the desired data node using the pointer associated with the desired telephone data record.

Also in accordance with the purposes of the invention, as embodied and broadly described, our invention comprises, in a telecommunications network, a two-tiered database comprising a first database stored in a memory, including a plurality of accessing data records, each accessing data record containing at least an accessing number designating a series of telephone numbers, a pointer, and an associated blocking factor; and a second database including a plurality of telephone data records divided into a plurality of data clusters, each data cluster being pointed to by one of the pointers in the plurality of accessing data records, each data cluster comprising a plurality of data nodes and including all of the telephone data records designated by the accessing number associated with the pointer pointing to the data cluster, each data node containing a number of individual telephone data records equal to the blocking factor.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of the specification, illustrate presently preferred implementations of the invention and, together with the general description given above and the detailed description of the preferred implementations given below, serve to explain the principles of the invention.

BEST MODE FOR CARRYING OUT THE INVENTION

Reference will now be made in detail to the construction and operation of preferred implementations of the present invention which are illustrated in the accompanying drawings. In those drawings, like elements and operations are designated with the same reference numbers where possible.

The following description of the preferred implementations of the present invention is only exemplary of the invention. The present invention is not limited to these implementations, but may be realized by other implementations.

The LIDB of the present invention includes multiple databases, having variable-length records, and a database manager. The variable-length records comprise some fixed-length components and some variable-length components. The database manager serves as the interface between the databases and any application component requesting data.

The LIDB of the present invention also includes a multitiered database that has two or more levels of line databases. A preferred embodiment of the LIDB of the present invention is shown in FIG. 3.

For any service that requests information from the LIDB 190 or 195, access to data begins in a primary index 310 in a group database and chains through a line data base 315 and any remaining databases 350 indicated by the line database 315. Pointers are used within the records of any level of database to access other databases.

Figure 1:
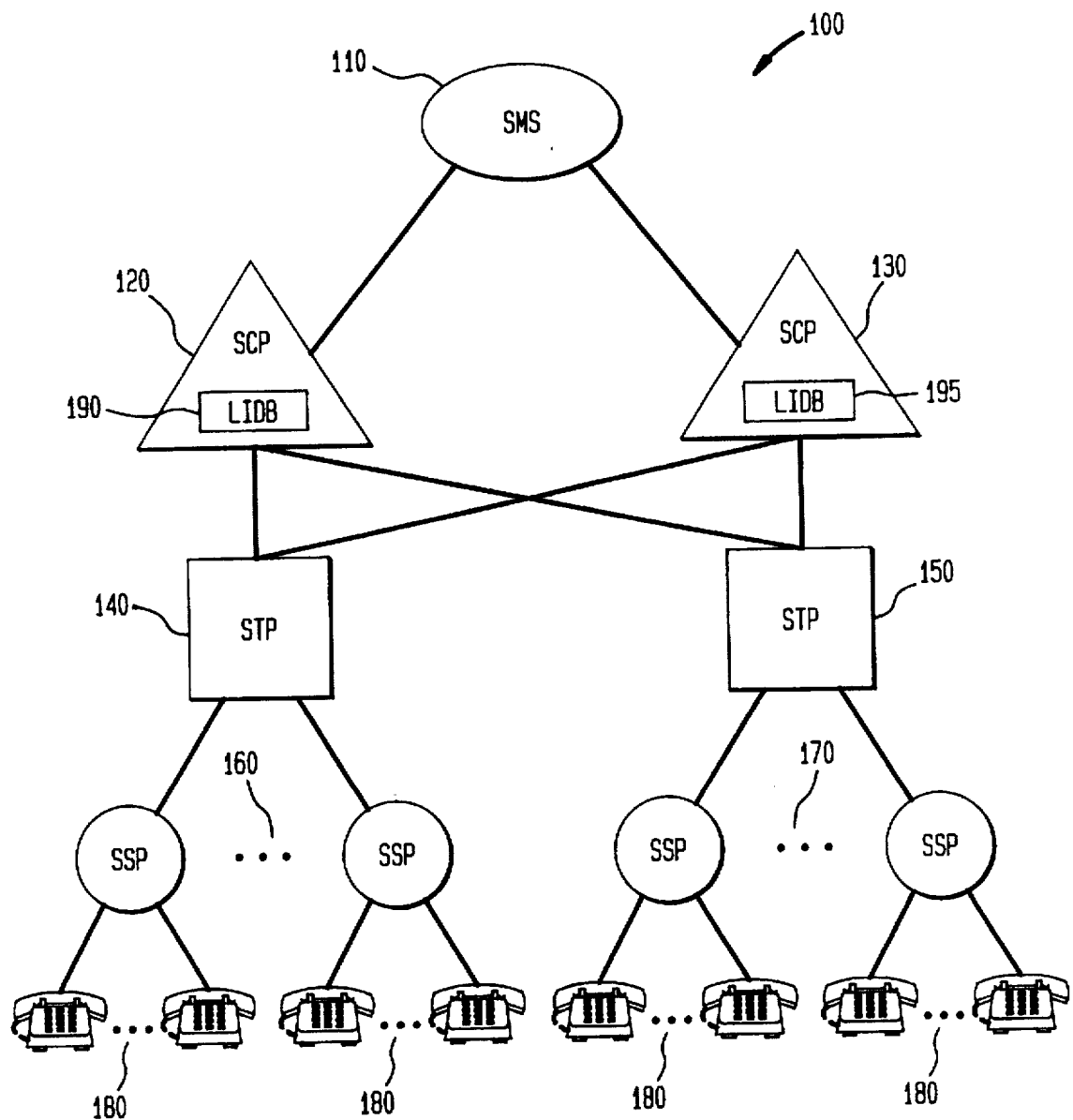
FIG. 1 is a block diagram of a current telecommunications network.
Figure 2A:
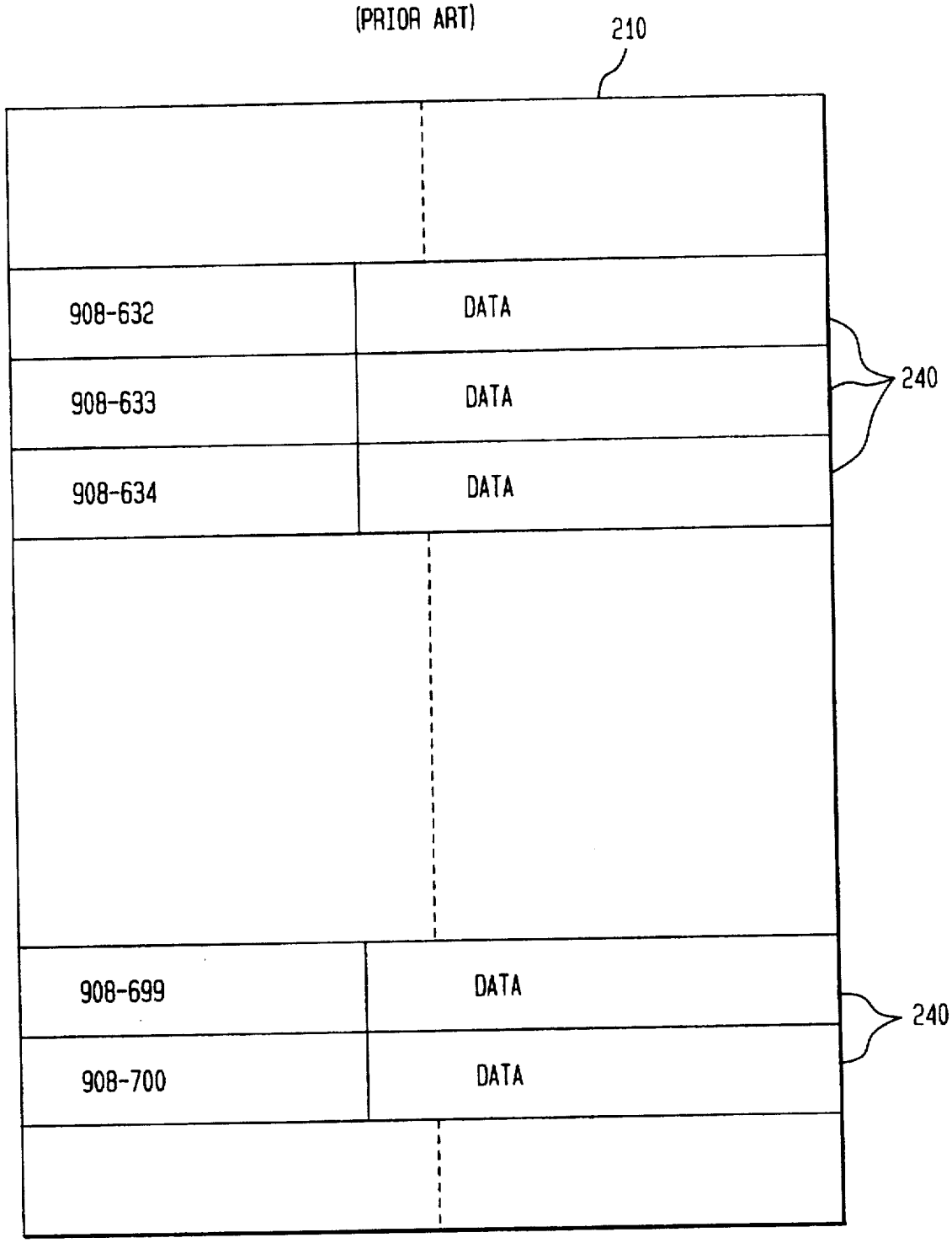
FIG. 2A is a block diagram of the group database of the current LIDB.
Figure 2B:
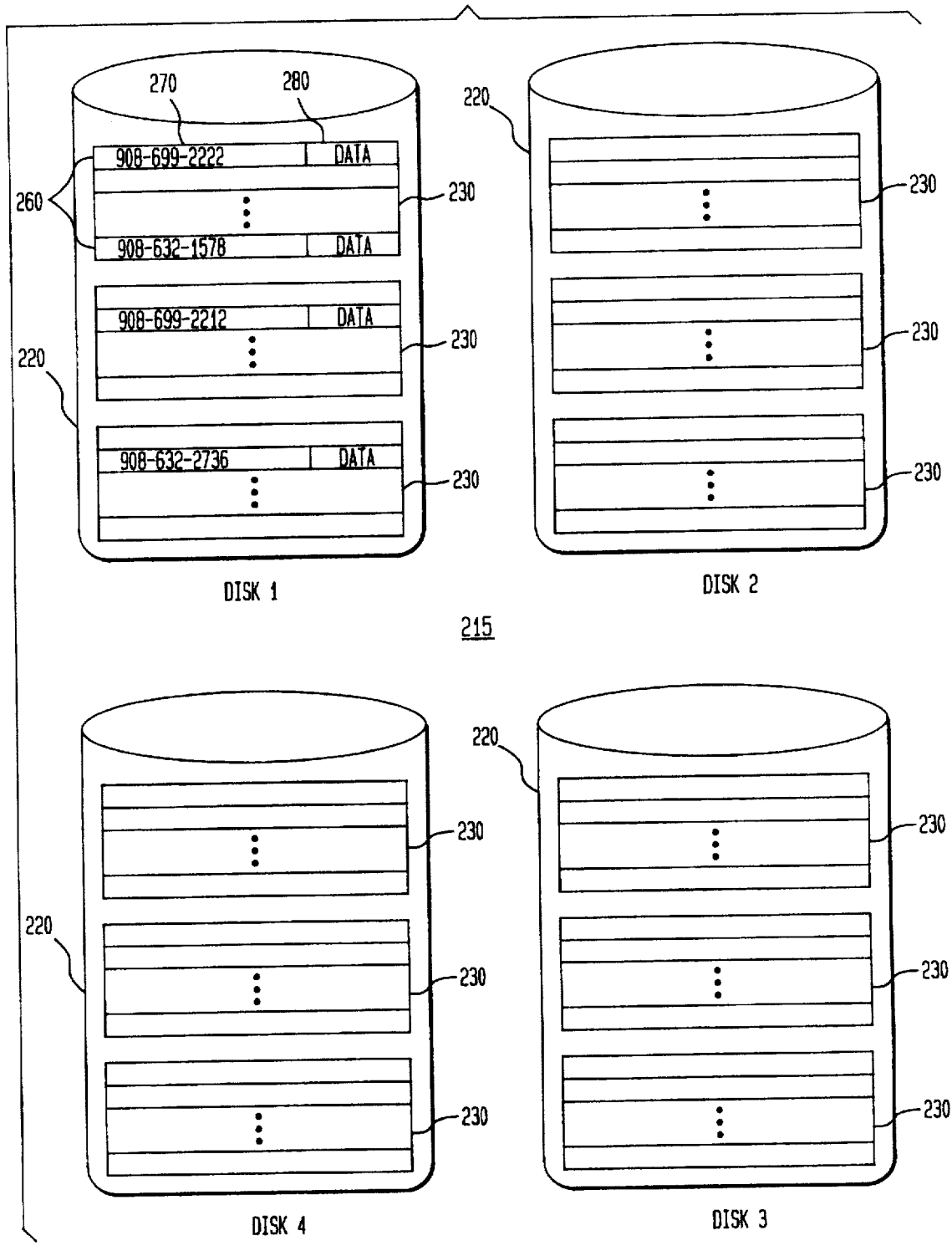
FIG. 2B is a block diagram of the line database of the current LIDB.
Figure 3:
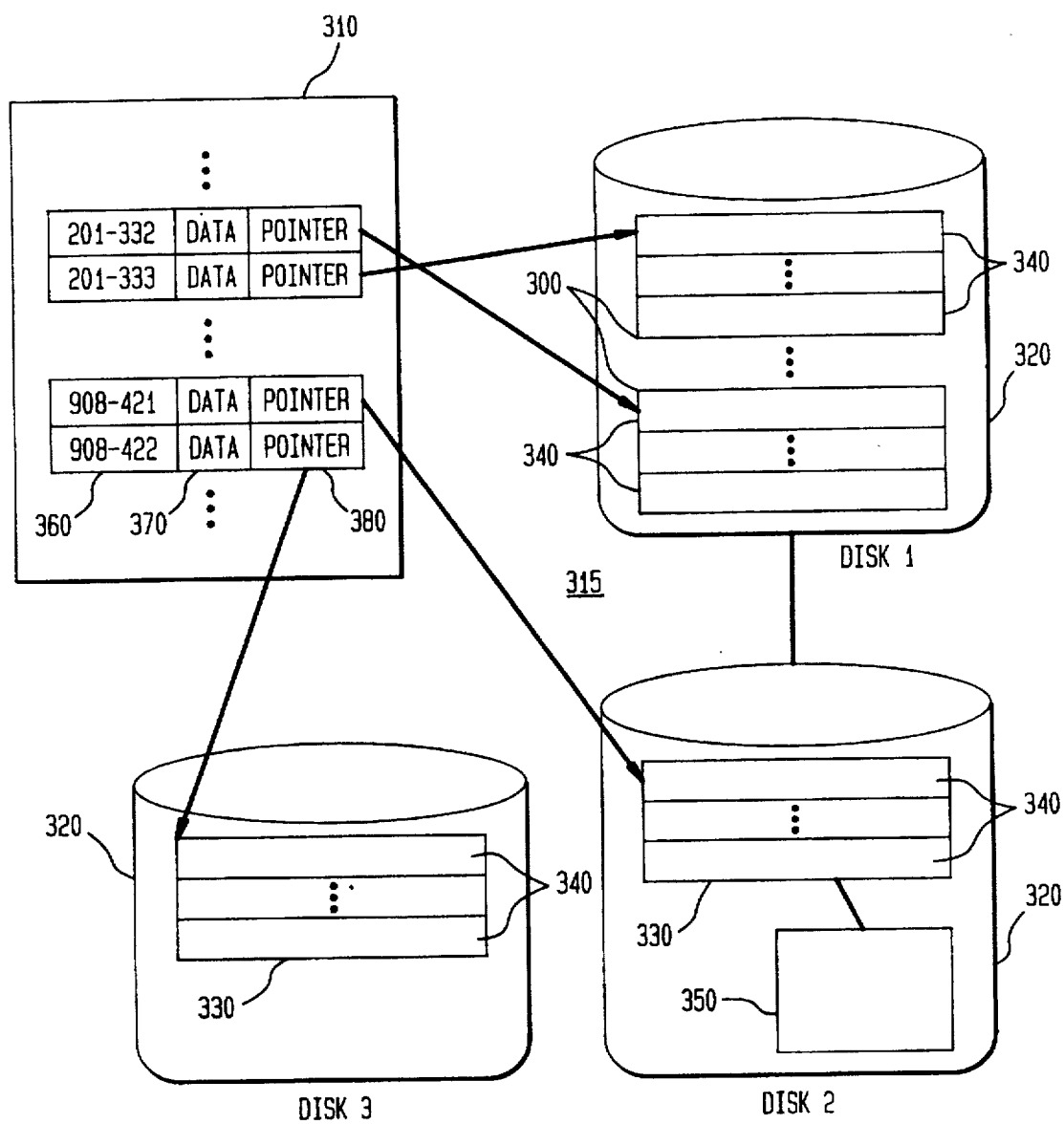
FIG. 3 is a block diagram of a preferred embodiment of the LIDB in accordance with one embodiment of the current invention.

In the preferred embodiment shown in FIG. 3, each entry, or accessing data record, in the primary index 310 preferably contains group keys 360, group data 370 common to all telephone numbers in the group, and pointers 380 pointing to the lower level data containing additional data relating to the telephone numbers in the group. In the case of a ten digit telephone number where the first six digits are used as a group key 360, the corresponding group data 370 applies to the 10,000 individual telephone lines having those six digits as their initial digits. The first six digits of a ten digit telephone number correspond to the area code and exchange for a telephone number, and are abbreviated "NPA-NXX."

An entry in one of the lower level databases contains line data pertaining to an individual telephone number. These entries in the lower level databases will be referred to as line records or telephone data records. In a preferred embodiment, line records related to a particular NPA-NXX key are stored in a data cluster ("DC") 330, which consists of a set of sequential logical data blocks known as data nodes ("DN") 340. The logical data blocks that form a data node 340 correspond to the data blocks in the operating system used by the software and hardware that accesses the disks 320 containing the lower level databases 315 and 350 to retrieve the desired data. In a preferred embodiment, each data node 340 is three logical data blocks in length.

Although in a preferred embodiment the data node size is fixed for all groups at a size of three logical data blocks, it is understood that the data node size could be any other constant integral number, or could vary and be stored as another field in the primary index 310.

Figure 4:
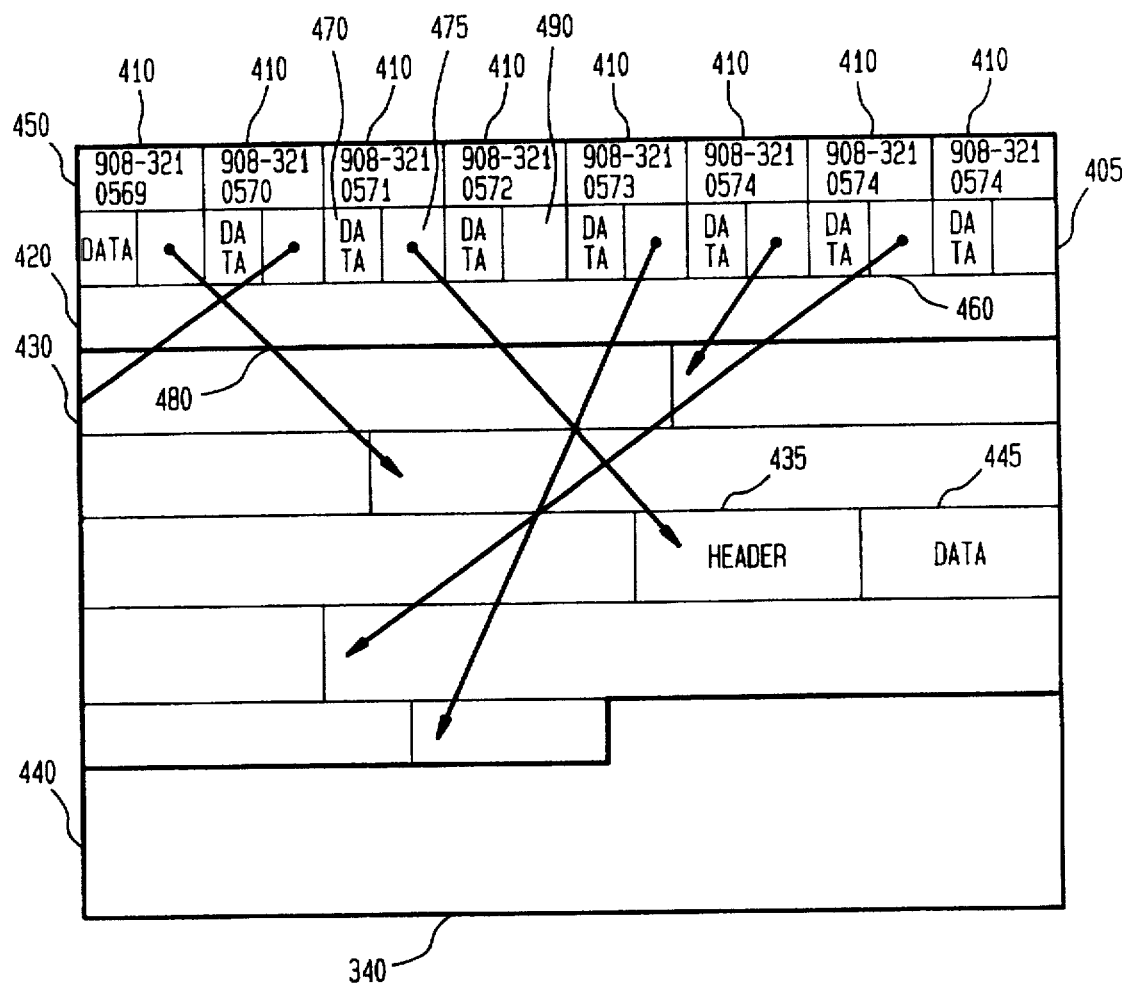
FIG. 4 is a block diagram of the data node of FIG. 3, in accordance with one embodiment of the current invention.

FIG. 4 is a block diagram of a data node in accordance with one embodiment of the present invention. As shown in FIG. 4, each data node 340 within a data cluster 330 is a fixed size and contains a header portion 405, a plurality of line records 430, and a free data space 440, which preferably has no information stored in it. Header portion 405 contains a number of index records 410 and a data node index 420 containing data node information. Each index record 410 contains an index number 450, index data 470, and a pointer field 475. The pointer field contains either a pointer 480 pointing to the line record 430 corresponding to the index number 450 or a null pointer 490 indicating that the telephone number corresponding to the index number 450 is not in service. The data node information index 420 preferably includes the portion common to each telephone number, such as the NPA-NXX, in the data node 340, as well as the location of the beginning of the free data space 440. Additional data can also be stored within each data node information index 420, such as the date of last update to a given record, and an indication of whether auxiliary data (stored outside of the data node) is defined for the record. The free data space 440 allows space for additional data to be stored in the plurality of line records 430.

The primary index 310 is functionally equivalent to the group database 210 present in current LIDB systems. Keyed by NPA-NXX, the primary index 310 is preferably memory resident, although a permanent disk based copy is kept for backup purposes. For services which require data common to a large number of telephone lines, such as ABS, the group data 370 in the primary index 310 contains data applicable to all lines referred to by the group key 360 held in that data record. An example of this data common to a large number of telephone lines would be the capability for using the Billed Number Screening service, which must be common to an entire exchange.

The group data 370 in the primary index 310 also contains a "blocking factor" associated with the data cluster 330 pointed to by the group pointer 380 associated with the group key 360 and group data 370. The blocking factor corresponds to the number of records indexed per data node 340 in the data cluster 330. The blocking factor, in conjunction with the pointer 380, is used to calculate the location of the data node 340 within the data cluster 330 in which a desired line record 430 is located according to the following equations:

DN number=telephone line number/blocking factor

DN location=DC start block+(DN number * DN size)

The DN location is used for reading the proper data node from the disk 320 in which it is stored.

In the preferred embodiment, all of the line records 430 for the telephone numbers indicated by a given key (NPA-NXX in the preferred embodiment) are distributed across a set of sequential data nodes 340 in a data cluster 330.

As shown in FIG. 4, the header portion 405 of the data node 340 contains a number of fixed-size entries 410 equal to the blocking factor. The entries in each index record 410 include a pointer 475 pointing to the start byte of the line record 430 and an index data 470 including the length of the line record 430. If the address is not null, the data for that line record can be found starting at the indicated byte in the data node 340. If the address is null, the line does not exist or is not in service. Once the pointer to a line record 430 and the length of the line record 430 have been obtained from the index, the record is directly accessible from within the data node.

Initially, data nodes 340 are sized such that all data required for the existing telephone services can be contained within a line record's 430 data node 340. If new data must be added that cannot be stored in the data storage space in an existing data node 340, the blocking factor for the data cluster 330 containing that data node 340 will be reduced to a smaller value such that the required data will fit into a new data node 340 having the same size, but fewer line records 430. In a preferred embodiment, this is accomplished by halving the blocking factor and splitting the line records 430 in each data node 340 into two separate data nodes 340.

In anticipation of longer records, an indicator in the data node index 420 denotes the extension of a line record beyond the data node. Initially, this indicator will be null, but it will be set when individual line records extend beyond the data node. For example, if a distribution list for a Message Transport and Routing System ("MTRS") service is defined as a field for a particular line record, the data would be stored in some other location and the record extension field in the index would be set. The information regarding the location of the extended data will be kept in the line record (within the data node) itself. The data itself can be kept on the same disk, another disk, or a random access memory.

Each line record 430 may also contain pointers to related/ additional data either within or external to the data node 340. The use of tiers in the lower level databases allows data to be stored optimally based on the nature of the data and the services for which it is used. For example, data relating to the Alternate Billing (ASS) and Calling Name Delivery (CNAM) services, which data occupies fewer than 50 bytes on average and requires fast access for a large number of queries, could be stored separately from distribution list data for the MTRS service, which is lengthy, and is only used by a very small number of queries with longer response time requirements. Thus, the number of tiers used for any given data can be driven by the performance requirements and data size for the type of service requesting the data.

In a preferred embodiment of the LIDB of the current invention, variable-length components with some fixed-length components are used in the lower level databases 315 and 350. The characteristics of these components are maintained in a memory based table in each line record. The memory-based table comprises a tag for each variable length component, and the definition of the tags, i.e., data type, length, etc. In a preferred embodiment, this information is stored in a line record header 435 in the line record 430. The data is then stored in a line record data portion 495, which comprises the remainder of the line record 430.

By using variable-length maintaining records, the LIDB of the current invention can dramatically reduce the size of the line records required for each telephone number. The variable length records eliminate the need to provide space for numerous fields which are not used in many services.

Figure 5:
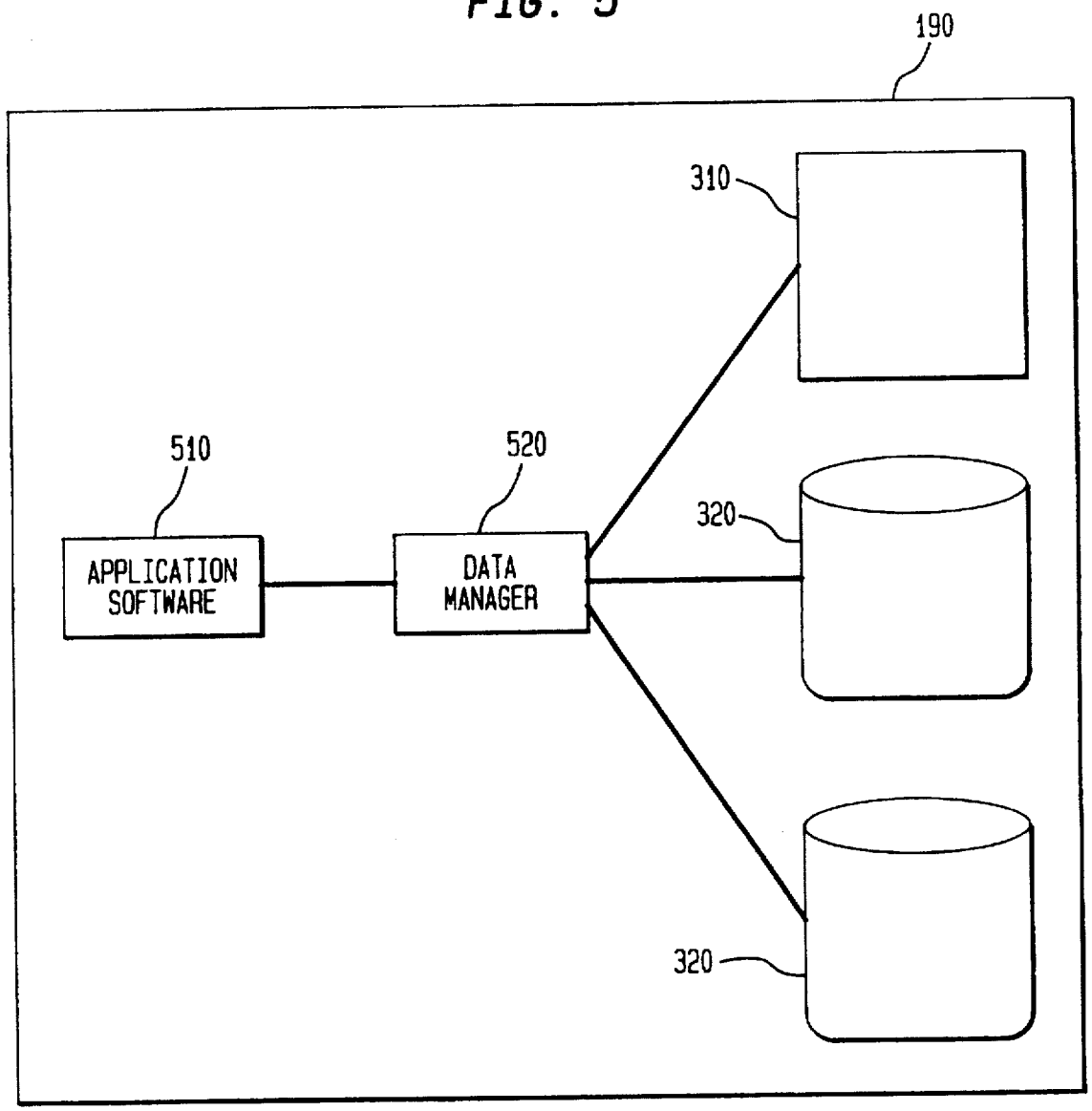
FIG. 5 is a block diagram of a data management system for the LIDB, in accordance with one embodiment of the current invention.

FIG. 5 shows a preferred embodiment of the LIDB 190 and 195. The LIDB 190 and 195 includes an application software portion 510, an data manager 520, a primary database 310, and a plurality of disks 320. As shown in FIG. 5, access to the data for any type of request is preferably provided by the application software 510 making a request to a database manager 520 in the LIDB, rather than accessing the database 310 and 320 directly. Thus, the application software 510 requesting the data need not have knowledge of the underlying data storage format. In a preferred embodiment, the application software 510 is the SCP/LIDB software executed in the SCP 120 or 130. The SCP/LIDB software is available from Bell Communications Research (Bellcore). The database manager 520 is preferably a software application written in C and VMS System Calls and implemented on a VAX 6000/DSSI. The database manager 520 serves as the interpreter between logical data requests from the application software 510 and physical data retrievals from the databases 310 and 320.

The database manager 520 is preferably a set of standard interface routines that can be used from within an existing LIDB application much like current access routines are used today. These routines are built upon direct access routines to the various levels of the database. It is understood, however, that as data complexity increases and other applications have a need to access data in the LIDB database, the database manager 520 functionality may be expanded to provide access to other databases required to fulfill more complex requests.

Figure 6:
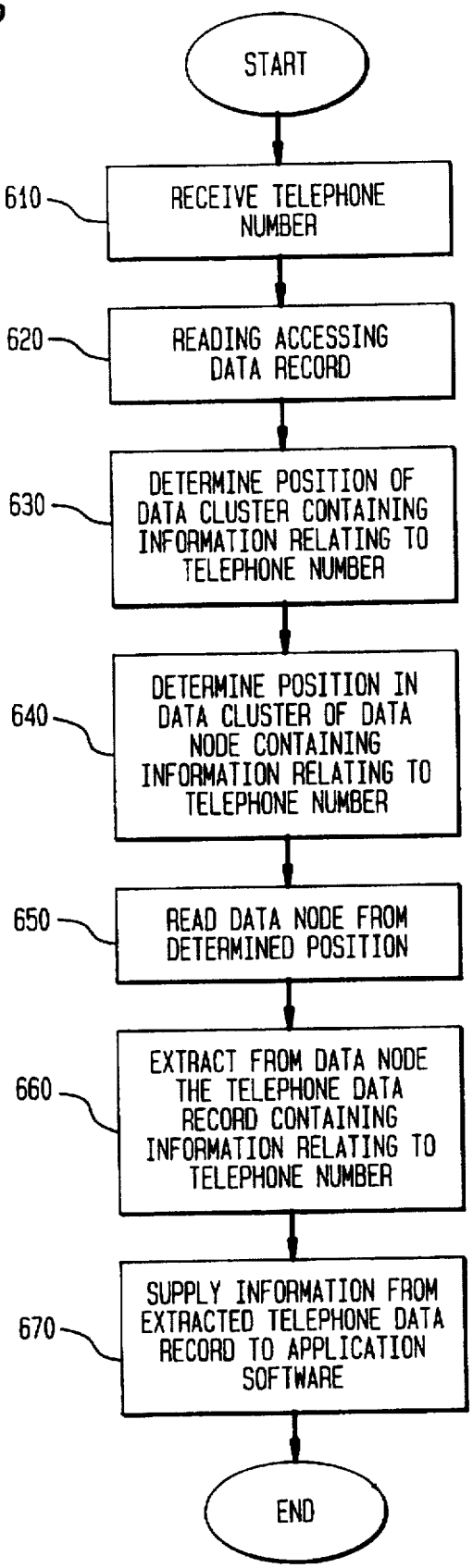
FIG. 6 is a flowchart showing the steps performed by the data manager of FIG. 5 in obtaining a telephone data record from the line database of FIG. 3.

FIG. 6 is a flowchart illustrating the steps performed by the data manager 520 of the preferred implementation to access a desired telephone data record containing data related to a given telephone number. As described above, the telephone data record 430 is stored in a data node 340, which in turn is stored in a data cluster 330 in the line database 315.

The data manager 520 begins by receiving from the application software 510 the telephone number for which additional information is desired (step 610). Then, the data manager 520 reads from the primary database 310 an accessing data record containing data related to the received telephone number (step 620).

Based on the data in the accessing data record, the data manager 520 determines the position of the data cluster 330 that contains data related to the received telephone number (step 630). As described above, the data manager 520 preferably determines the position of the data cluster 330 based on a pointer 380 stored in the accessing data record.

The data manager 520 then determines the position of the data node 340 in the data cluster 330 that contains the data related to the received telephone number (step 640). As described above, the data manager 520 preferably determines the position of the data node 340 based on the location of the data cluster 330, the telephone number, and the blocking factor.

After determining the location of the data node 340, the data manager 520 then reads the contents of the data node 340 from the line database 315 (step 650) and extracts from the data node 340 the telephone data record 430 that contains the data related to the received telephone number (step 660). As described above, the data manager 520 extracts the telephone data record 430 based on a pointer 490 in the header portion 405 of the data node 340.

The data manager 520 then supplies the extracted data to the application software (step 670) and the data access ends.

Using the LIDB of the present invention, an increase in the number of queries/second per database set can be realized. For example, in the preferred embodiment an increase of at least 30% can be realized with an average access time under 100 milliseconds.

The performance of this scheme relies on the ability to locate and access data for a given requested telephone line with a single disk access. This is accomplished through the use of a function that determines, based on the data stored in the primary index 310, the starting location of the data cluster in the group database 315 where the data for the requested telephone line record 430 is stored and the offset (in terms of logical data blocks) of the data node 340 within the data cluster 330 that contains the desired line record 430. The data actually transferred from the group database 315 consists of a data node 340 comprising a fixed number of logical data blocks which contain a localized index to the set of line records contained in that data node.

In a preferred embodiment of the present invention, modifications to existing fields, such as expanding a field from three to four digits, can be easily accomplished. Modifying a field can be accomplished by simply changing the definition of the field in the database table and streaming through the database and converting (or expanding) existing instances of the field. In this case, some of the line records 430 that have increased in size may be moved from their current location in the data node 340 into a larger empty data storage space in the free data space 440. In this case, the location of the former location of the moved line record 430 is stored in the data node index 420 so that the now empty space can be used to store a smaller line record that is increased to a size still smaller than the now empty space formerly occupied by the previous larger line record. In this way, the data storage space in the data nodes is used efficiently, and empty data storage areas are filled in with line records that fit within them.

As noted above, the use of multiple tiers of databases, with pointers to lower level databases and indication of record types and sizes allows for the flexible storage of disparate data elements for other services accessing LIDB.

For example, the Originating Line Number Screening ("OLNS") service retrieves some of the same information required by ABS service queries, but requires additional information to provide appropriate handling of directory assistance and toll calls, such as a primary language indicator. The addition of the OLNS data to the ABS data using this scheme facilitates the addition of the query processing to LIDB Call Processing.

MTRS is a service whose data is initially line based, but would only be present on a small portion of the lines in a single database. The data for this service is potentially large, including entire distribution lists, and access to it need not be in real-time. This type of data could easily be stored in a separate database and accessed by a pointer within the line record data entry.

Validation of Credit Card numbers for Alternate Billing (or other) services can make use of the first eight digits of the card as the primary index, followed by an appropriate blocking factor in the data section. In addition, any other numbering scheme which can be decomposed into a single high level and multiple lower level keys are within the scope of this invention.

Some region specific services may make use of some existing data as well as some additional fields which could be stored as additional variable components of the line record or, if performance would be optimized, by defining a new fixed component.

Because of its more efficient data storage techniques, the LIDB of the current invention can store the requisite 30 million line records in a space smaller than that required by the current LIDB. The size of an existing LIDB line record is 128 bytes. Using a maximum size of 204 records per hash bucket, and a 50% fill factor in the hash bucket, an RF73 storage device has capacity to store 7.65 million LIDB records, and an RA92 storage device has capacity for 5.8 million records.

In the LIDB of the current invention, the projected line record sizes for similar records are only 50 bytes on average. Since the projected record sizes are significantly less than 128 bytes, each RF73 storage device could physically contain in excess of 20 million 50 byte records using a 9 byte index per record and a 75% fill factor. This greatly increases the use of each database set from the current use by avoiding the requirement of setting up space for a number of unused fields for each line number.

The use of the first two database tiers described above would allow the current ABS and CNAM queries and data to be serviced and administered in much the same way that they are today, with a reduction in the required size of the underlying data storage. The reduction is achieved by storing only those fields, on a per-record basis, which are actually used for the services as they are currently defined or as they are expected to be used in the near future.

In addition, many modifications may be made to adapt a particular element, technique or implementation to the teachings of the present invention without departing from the central scope of the invention. Therefore, it is intended that this invention not be limited to the particular embodiments and methods disclosed herein, but that the invention include all embodiments falling with the scope of the appended claims.

We claim:

1. In a telecommunications network, a method for reading a desired telephone data record associated with a given telephone number from a line record database, the method comprising the steps, executed by a data processor, of:

reading from an index database stored in a memory an accessing data record containing at least an accessing number designating a series of telephone numbers including the given telephone number, a pointer pointing to a data cluster in the line record database, and a blocking factor associated with the data cluster, the data cluster comprising a plurality of data nodes and including all of the telephone data records associated with the series of telephone numbers designated by the accessing number and the blocking factor corresponding to the number of records indexed per data node in the data cluster, each data node containing a number of individual telephone data records up to the blocking factor and a number of pointers each pointing to one of the number of individual telephone data records;

accessing the data cluster;

determining the position of a desired data node containing the desired telephone data record in the data cluster, the total number of telephone numbers in the data cluster, and the blocking factor;

reading the desired data node; and extracting the desired telephone data record from the desired data node using the pointer associated with the desired telephone data record.

2. The method of claim 1, wherein the accessing number comprises the first N digits of the designated series of telephone numbers, where N is an integer and the designated series of telephone numbers has a common first N digits.

3. The method of claim 2, wherein the first N digits comprise the area code and exchange numbers associated with the designated series of telephone numbers.

4. The method of claim 1, wherein the telephone data records in each data cluster are organized in a set order, the set order being sequential order by data node, each data node containing a number of telephone data records associated with a sequential group of telephone numbers equal to the blocking factor, the telephone numbers in a given data node all being lower than the telephone numbers in the next data node, and the pointers in each node being in a set position and ordered sequentially.

5. The method of claim 4, wherein each data node except the last data node in a data cluster must have a number of telephone data records equal to the blocking factor, and the step of determining the position of the desired data node is performed by dividing the total number of telephone numbers in the data cluster by the blocking factor and rounding up all fractions.

6. In a telecommunications network, a system for reading a desired telephone record associated with a given telephone number from a line data record base, the system comprising:

a memory storing a first database including a plurality of accessing data records, each accessing data record containing at least an accessing number designating a series of telephone numbers, a pointer, and an associated blocking factor;

a memory storing a second data base including a plurality of telephone data records divided into a plurality of data clusters, each data cluster being pointed to by one of the pointers in the plurality of accessing data records, each data cluster comprising a plurality of data nodes and including all of the telephone data records designated by the accessing number associated with the pointer pointing to the data cluster, each data node containing a number of individual telephone data records up to the blocking factor and the blocking factor corresponding to the number of records indexed per data node in the data cluster; and means for reading the desired data node record to obtain the desired telephone data record using the pointer associated with the desired telephone data record.

7. The system for reading a desired telephone record of claim 6, wherein the accessing number comprises the first N digits of the designated series of telephone numbers, where N is an integer and the designated series of telephone numbers has a common first N digits.

8. The system for reading a desired telephone record of claim 7, wherein the first N digits comprise the area code and exchange associated with the designated series of telephone numbers.

9. The system for reading a desired telephone record of claim 6, wherein the telephone data records in each data cluster are organized in a set order, the set order being sequential order by node, each node containing a number of telephone data records associated with a sequential group of telephone numbers up to the blocking factor, the telephone numbers in a given data node all being lower than the telephone numbers in the next data node, and the pointers in each data node being in a set position and ordered sequentially.

10. The system for reading a desired telephone record of claim 6, wherein each data node except the last data node in a data cluster must have a number of telephone data records equal to the blocking factor.

* * * * *